United States Patent [19]

Zeichner et al.

[11] 4,205,999

[45] Jun. 3, 1980

[54] CONTINUOUSLY OPERATING CENTRIFUGAL

[75] Inventors: Erwin Zeichner, Brunswick; Heinrich Kurland, Lucklum; Hermann Luehrs, Grevenbroich, all of Fed. Rep. of Germany

[73] Assignee: Braunschweigische Maschinenbauanstalt, Brunswick, Fed. Rep. of Germany

[21] Appl. No.: 3,983

[22] Filed: Jan. 16, 1979

[30] Foreign Application Priority Data

Jan. 25, 1978 [DE] Fed. Rep. of Germany ....... 2803160

[51] Int. Cl.[2] ........................ C04B 15/00; C04B 5/00; C13F 1/06

[52] U.S. Cl. ........................................ 127/19; 127/22; 210/380 R

[58] Field of Search .................... 127/19, 22; 210/380, 210/381

[56] References Cited

U.S. PATENT DOCUMENTS 3,238,063 3/1966 Steele .................................... 127/19

4,008,098 2/1977 Dietzel .................................. 127/19

FOREIGN PATENT DOCUMENTS 1379054 10/1964 France .

*Primary Examiner*—Sidneý Marantz

*Attorney, Agent, or Firm*—W. G. Fasse; D. F. Gould

[57] ABSTRACT

A continuously operating centrifugal or centrifuge for centrifuging sugar massecuites and for remashing the centrifuged sugar, comprises a ring conduit with nozzles for mixing liquid directed at the upper wide end of the centrifugal basket. The ring conduit is arranged in a housing having a cover, above a frustum-shaped centrifugal basket equipped with screens and rotating about a vertical axis of rotation. A conical baffle member is arranged radially outside of the upper edge of the centrifugal basket for intercepting the sugar crystals. A cover ring is mounted at the upper end of the centrifugal basket at a small distance from the ring conduit. The radial width of the cover ring corresponds at least to the spraying range of the nozzles for the mixing liquid. The conical baffle member is shaped like a frustum and opens upwardly. The centrifuge includes a mixing compartment enclosed by smooth walls.

4 Claims, 2 Drawing Figures

CONTINUOUSLY OPERATING CENTRIFUGAL

BACKGROUND OF THE INVENTION

The invention relates to a continuously operating centrifugal or centrifuge for centrifuging sugar massecuites and for remashing the centrifuged sugar. Such centrifuges may include conventionally a ring conduit with nozzles for directing mixing liquid at the upper wide end of the centrifugal basket.

The ring conduit is arranged in a housing having a cover above a frustum-shaped centrifugal basket equipped with screens and rotating about a vertical axis of rotation. A conical baffle member is arranged radially outside the upper edge of the centrifugal basket for intercepting or catching the sugar crystals.

The idea of remashing the sugar centrifuged in a continuously operating sugar centrifuge before it leaves the centrifugal in order to thus obtain a new massecuite which may readily be fed without any further treatment, especially without any further mixing treatment into a following centrifugal, has been mentioned in several publications. These publications, however, preferably emphasize other problems. For example: the prevention of damage to the sugar crystal, or the prevention of the formation of lumps or of so-called tailings, or the discharge of the centrifuged sugar in a liquid medium have been emphasized heretofore. Thus, it is not surprising, that such known, prior art centrifugals are not capable of performing a technologically satisfactory mashing work.

The U.S. Pat. No. 2,883,054, for example, is concerned with a continuously operating horizontal centrifugal, having a basket, the rotational axis of which extends horizontally. The wide end of the frustum-shaped centrifugal basket merges into a sugar collecting compartment, which is designed as a torus opening towards the axis of rotation of the centrifugal basket. A ring conduit is arranged inside the sugar collecting compartment and concentric to the outer circular arc of said torus, said ring conduit is connected to a supply line for a treating agent and has exit orifices for said treating agent. The orifices are directed at the inner surface of the torus. The treating agent to be used may be either solvent liquid for again solving, or a liquor for remashing, or hot compressed air for drying the centrifuged sugar.

The remashing may at best be performed in this known centrifugal to the extent that a product of an inhomogeneous consistency is obtained, because the crystal mash formed in the top region of the sugar collecting compartment flows downwardly along both sides due to gravity, whereby the mash is hit on one side by the sugar crystals moving in the discharge direction, while on the other side the mash is hit by sugar crystals flying in the opposite direction which decelerate the mash and thus enriches it with sugar to a substantially greater extent than on the first side. Thus, at the lowest point of the sugar collecting compartment, two streams of different consistencies meet, which do not mix into a homogeneous product without any subsequent mechanical treatment. Furthermore, small or larger quantities of material cannot be prevented from coming off the top of the sugar collecting compartment and falling down. These material quantities might differ considerably in their consistencies from the confluent material streams, whereby the inhomogeneity of the product is also substantially increased.

The primary problem solved by the sugar centrifugal according to German Patent Publication (DAS) No. 2,025,828 is to completely prevent the formation of lumps in centrifuging the crystals in continuously operating centrifugals. To solve this problem, the upper end of the centrifugal basket is encircled by a fixed intercepting ring, wherein the introduced liquid rotates with a circumferential speed which is lower than the speed of the centrifugal basket. The rotation of the liquid ring or of the liquid-crystal mixture formed in this ring is produced by the air friction caused by a discharge flange which, depending to the type product, dips more or less into the intercepting ring and is secured to the centrifugal basket. The liquid may be introduced into the intercepting ring in different ways. The liquid-crystal mixture is removed from the ring at a single point on the circumference of the intercepting ring through an outlet connection.

This known centrifugal of German Patent Publication No. 2,025,828 leaves room for improvement in its structural features. When switching from one to another production, a great deal of assembly work is necessary for fitting the required discharge flange. For this purpose the intercepting ring must be disassembled among other required work. Routine cleaning work is similarly troublesome. Without subsequent mechanical mixing it is not possible to feed the produced liquid-crystal mixture as a massecuite directly into a following centrifugal because a high rotational speed of the intercepting ring results in sedimentation in said ring, i.e., de-mixing in the intercepting ring, whereas lower speeds do not produce a mixing energy high enough to ensure the homogeneity of the liquid-crystal mixture at the outlet connection.

The U.S. Pat. No. 3,238,063 describes a centrifugal wherein a circular pipe is arranged at some distance from the upper wide end of a frustum-shaped centrifugal basket, that is, above a flat end ring attached to the upper basket end. Mixing liquid or—if the sugar shall be remashed—mashing liquid is sprayed out of the circular pipe at the sugar crystals flying over the end ring. A vertically suspended baffle plate made of elastic material is arranged radially outside of the end ring. The baffle plate is intended to intercept the sugar crystals without destroying the crystals and without the formation of bumps. However, a product that may be fed directly as a massecuite into a following centrifugal without any further, treatment, especially mixing, cannot be produced, because there are too many ways in which, quite accidentally, differently concentrated liquid-crystal mixtures may result or occur. For example, the mashing liquid is sprayed onto the sugar crystals from a comparatively large distance, namely, from the upper edge of the centrifugal basket in the radial direction of the basket whereby a widely fanned out spray pattern is obtained. Such a spray pattern permits the very strong air turbulences prevailing in continuously operating centrifugals to attack the sprayed-on liquid over large areas and to prevent, or unpredictably impair the desired intimate mixing of crystals and liquid. The vertically suspended baffle plate also produces inhomogeneity. As a result of the air turbulences which more or less break up the mixing liquid, the sugar crystals hit the baffle plate in differently moistened states. This fact aside, varying adhesivenesses also result in different situations despite the elasticity of the baffle plate. Part of the sugar flows off downwardly together with the mashing liquid, part of the sugar temporarily adheres and steadily picks up other centrifuged sugar crystals whereby the sugar is enriched with crystals, while the impinging liquid separates out and flows off downwardly. The result is an inhomogeneous product. Past experiences have shown that elastic materials for the baffle plates can withstand the wearing stress brought about by the sugar crystals impinging on the plate at a high velocity for a very short time only, which made practical use impossible. However, if the elastic baffle plate in this centrifugal is replaced by a steel plate, the crystals are destroyed and the product is not suitable as a massecuite.

U.S. Pat. No. 4,008,098 discloses a continuously operating sugar centrifuge wherein the sugar crystals passing over the upper edge of the centrifugal basket are sprayed from above with solving liquid and are then intercepted by a fixed wall or baffle ring which is arranged in an inclined position relative to the direction of crystal flight. The inclination of this baffle ring is such, however, that the material is deflected downwardly from the point of interception in such a way that it is impossible for the material to return to the interception area. The hard surface of the baffle ring contributes to crystal crushing and its inclination ensures that the crystals always hit the hard crystal-crushing surface. This known construction of a centrifugal may be suitable for returning the sugar into solution but it is not suitable for a most gentle crystal handling as is required for mashing. The baffle ring in the prior art centrifuge of U.S. Pat. No. 4,008,098 causes crystal destruction. Even the so-called "pad" formation which is known as such does not lent itself to preventing crystal destructions because in known centrifuges wherein the centrifuged sugar was to be mashed again the pad formation has been the cause of an uncontrollable inhomogeneous consistency of the produced mash.

OBJECTS OF THE INVENTION

In view of the foregoing it is the aim of the invention to achieve the following objects singly or in combination:

to provide a continuously operating mashing type centrifuge which supplies a homogeneous product that may be fed directly as a massecuite, without any further after-treatment, into a centrifugal;

to substantially avoid the crystal destruction in a mashing centrifuge and to treat the sugar crystals as gently as possible;

to construct the centrifuge with a deflection plate or conical baffle section inclined for the formation of a relatively soft sugar crystal pad on which the impinging sugar crystals will not be destroyed; and to minimize air turbulences in the centrifuge.

SUMMARY OF THE INVENTION

The centrifuge according to the invention is characterized in that a cover ring is mounted at the upper end of the centrifugal basket at a small distance from a ring conduit. The radial width of said cover ring corresponds at least to the spraying range of the nozzles for the mashing liquid. A conical baffle section is frustum-shaped and opens or flares out upwardly, preferably at a predetermined angle such as 45° relative to the vertical. The mashing space in the present centrifuge is enclosed by walls having smooth surfaces to minimize air turbulences in the centrifuge.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS ILLUSTRATING THE BEST MODE OF THE PRESENT INVENTION

Figure 1:
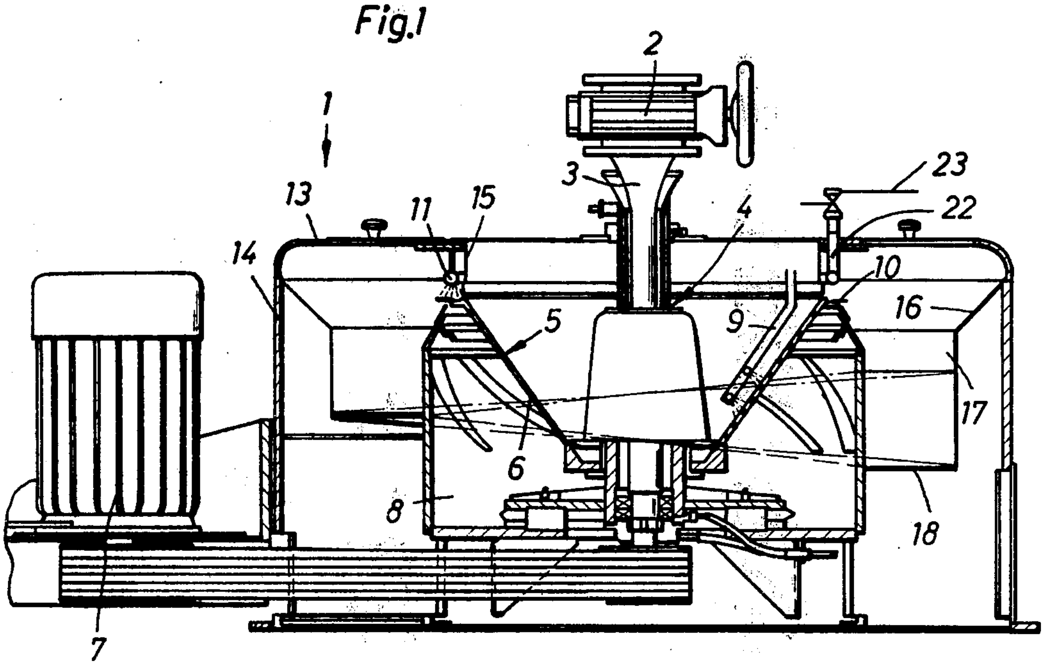
FIG. 1 is a sectional view of a centrifuge according to the invention.
Figure 2:
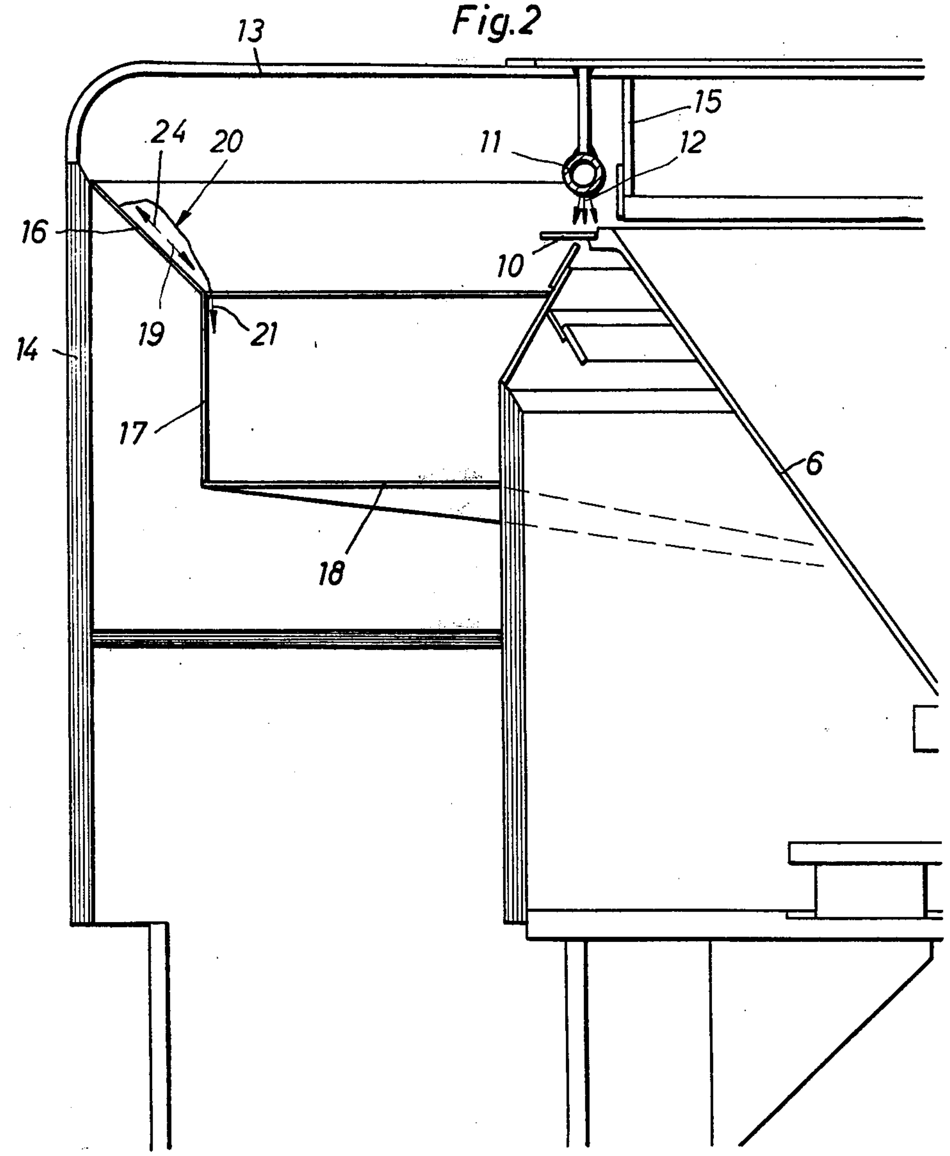
FIG. 2 shows on an enlarged scale a sectional view of the mixing zone of the centrifuge of FIG. 1.

FIGS. 1 and 2 show a continuously operating centrifugal 1, which is charged with massecuite 3 by means of a proportioning slide valve 2.

After passing through a feeding device 4, the massecuite 3 flows into a frustum-shaped centrifugal basket 6 equipped on the inside thereof with screens 5. Said basket 6 is rotatable about a vertical axis and is driven by a motor 7.

The liquid component of the massecuite 3 is collected in a liquid collecting compartment 8; the sugar crystals travel across the screen 5. Wash liquid may be ejected by the wash water nozzles 9.

At the upper end of the centrifugal basket 6 the sugar crystals pass over a cover ring 10. A ring conduit 11 is mounted at a small distance above the cover ring 10. Mashing liquid 12 is sprayed directly at the cover ring 10 out of the ring conduit 11.

A vertically downwardly pointing ring wall 15 is secured to the cover of the outer housing 14 of the centrifuge 1. The ring wall 15 extends to the upper edge of the centrifugal basket so closely that substantially no air turbulences may escape outwardly from the inside of the centrifugal basket 6. Any air eddies still escaping are reduced to such an extent that they are unable to change the direction of the jets of the mashing liquid 12.

The cover ring 10 has such a radial width that the mashing liquid jets 12 hit it under all circumstances.

A conical baffle section 16 is secured to the outer housing 14, radially outside of the cover ring 10. The baffle section 16 is formed as an upwardly opening frustum in a preferred embodiment, the generatrix of the frustum is inclined by approximately 45° from the vertical and the point of interception of the sugar crystals on the conical baffle section 16 is located substantially in the middle of the generatrix.

A cylindrical mash discharge compartment 17 is connected to the inner, lower end of the conical baffle section 16. The mash discharge compartment 17 has a helical, downwardly sloping bottom 18.

Sugar crystals passing over the cover ring 10 are thoroughly and evenly wetted by the mashing liquid 12 directed by the jets at the cover ring 10. Any mashing liquid 12 not hitting any sugar crystals reaches the cover ring 10 and is carried along by said ring whereby, just as the sugar crystals, it is centrifuged outwardly towards the conical baffle section 16. Thus, a homogeneously composed mixture of wetted sugar crystals and mashing liquid is produced by this process everywhere on the circumference.

When this mixture hits the conical baffle section 16, the inherent kinetic energy makes it move up on the slope of the conical baffle section 16, as indicated by the arrow 24 in FIG. 2. When the kinetic energy has been used up, gravity makes the material flow downwardly as indicated by the arrow 19, so that it enters the interception area again.

This movement as indicated by the arrows 19, 20 produces a soft pad 20 which prevents destruction of the impinging crystals. At the same time, the impinging sugar crystals cause a thorough mixing and kneading in the pad 20. A homogeneous mixture is produced, which flows down as mash into the mash discharge compartment 17 as indicated by the arrow 21. This product may be fed, without any homogenizing after-treatment, as a massecuite into a centrifuge.

All the wall surfaces surrounding the mixing compartment 17, which is outwardly also enclosed by the conical baffle section 16, are plain and smooth to prevent air eddies or turbulences.

Mashing liquid, which preferably has a constant initial pressure of approximately 2 bar, is supplied to the ring conduit 11 through a feed pipe 22 including at least one control valve 23. The automatic control of the quantity of the massecuite 3 flowing in, of the pressure, and of quantity of the mashing liquid 12 supplied, ensure a product having a constant quality.

The present centrifuge operates as follows. The mashing liquid is sprayed onto the suitably wide cover ring 10 and thus onto the sugar sliding over the cover ring 10. The distance between the ring conduit 11 and the cover ring 10 is so small that any air eddy is substantially prevented from entering into the jets of liquid. Even if, in spite of all countermeasures taken, occasional air eddies get into the range of the liquid jets, such stray eddies do not have any or substantially no influence on the direction of the liquid jets. Due to the fact that the mashing liquid jets are concentrated on the cover ring 10, part of the mashing liquid is brought into a direct intimate contact with the sugar crystals, while that part of the mashing liquid hitting the cover ring 10 itself is entrained by the high circumferential speed of the ring 10 and thrown into the same zone in which the sugar crystals also move. Thus, a homogeneous mixture is produced already during the flight of the liquid and of the sugar crystals.

This mixture first travels upwardly on the conical baffle section 16 under the action of a kinetic energy as shown by arrow 24. After traversing a short distance, that is, as soon as the kinetic energy is used up and gravity becomes predominant, the mixture moves down again as indicated by arrow 19 and gets into the interception area at the lower end of the baffle section 16. Thus, a soft pad 20 of flowing-back material is formed according to the invention, at the point of interception between the hard wall of the conical baffle section 16 and the impinging homogeneous liquid-crystal mixture.

This pad 20 has the advantage that it prevents the crystals from being damaged. The kinetic energy of the homogeneous liquid-crystal mixture impinging on this pad 20 is imparted to the material and causes a thorough mixing or kneading, before the mash thus produced flows off downwardly out of the interception area. The homogeneity of the liquid-crystal mixture impinging on the conical baffle 16 or rather on the continuously formed material pad 20, the prevention of the detrimental effects of air eddies, and the fact that there are constant conditions everywhere on the cover ring 10 and on the conical baffle 16, have the advantageous effect that a completely homogeneous product flows off the interception area. Such homogeneous product may be fed, without any further homogenization as a massecuite into a centrifugal.

Although the invention has been described with reference to specific example embodiments, it is to be understood, that it is intended to cover all modifications and equivalents within the scope of the appended claims.

What is claimed is:

1. A continuously operable centrifuge for centrifuging sugar massecuites and for remashing the centrifuged sugar comprising housing means, centrifugal basket means having an upper wide end and a lower narrow end operatively supported in said housing means, inlet means for said sugar massecuites, ring conduit means arranged above the upper end of said basket means, downwardly facing jet nozzle means in said ring conduit means, cover ring means arranged to surround said upper, wide basket end so that sugar crystals may move over said cover ring means, said jet nozzle means facing said cover ring means, said cover ring means having a given radial width, said jet nozzle means having a given vertical spacing from said cover ring means, said radial width and said vertical spacing being so selected relative to each other that the radial width corresponds at least to the width of the spray cones of liquid sprayed from said jet nozzles in the plane defined by said cover ring means, said centrifuge further comprising conical baffle means surrounding said basket means, said conical baffle means having the shape of a frustum the wider end of which faces upwardly.

2. The centrifuge of claim 1, further comprising means including said baffle means, for defining a mashing space around said basket means, said mashing space defining means having inwardly facing smooth wall surfaces for minimizing air turbulences in said mashing space.

3. The centrifuge of claim 1 or claim 2, wherein said conical baffle means comprise upwardly and radially outwardly flaring conical wall means facing said cover ring means and said ring conduit means.

4. The centrifuge of claim 3, wherein said conical wall means form an angle relative to the vertical of about 45°.

* * * * *